March 6, 1962 S. D. TINE 3,023,849
AIR LINE LUBRICATOR
Filed May 16, 1960
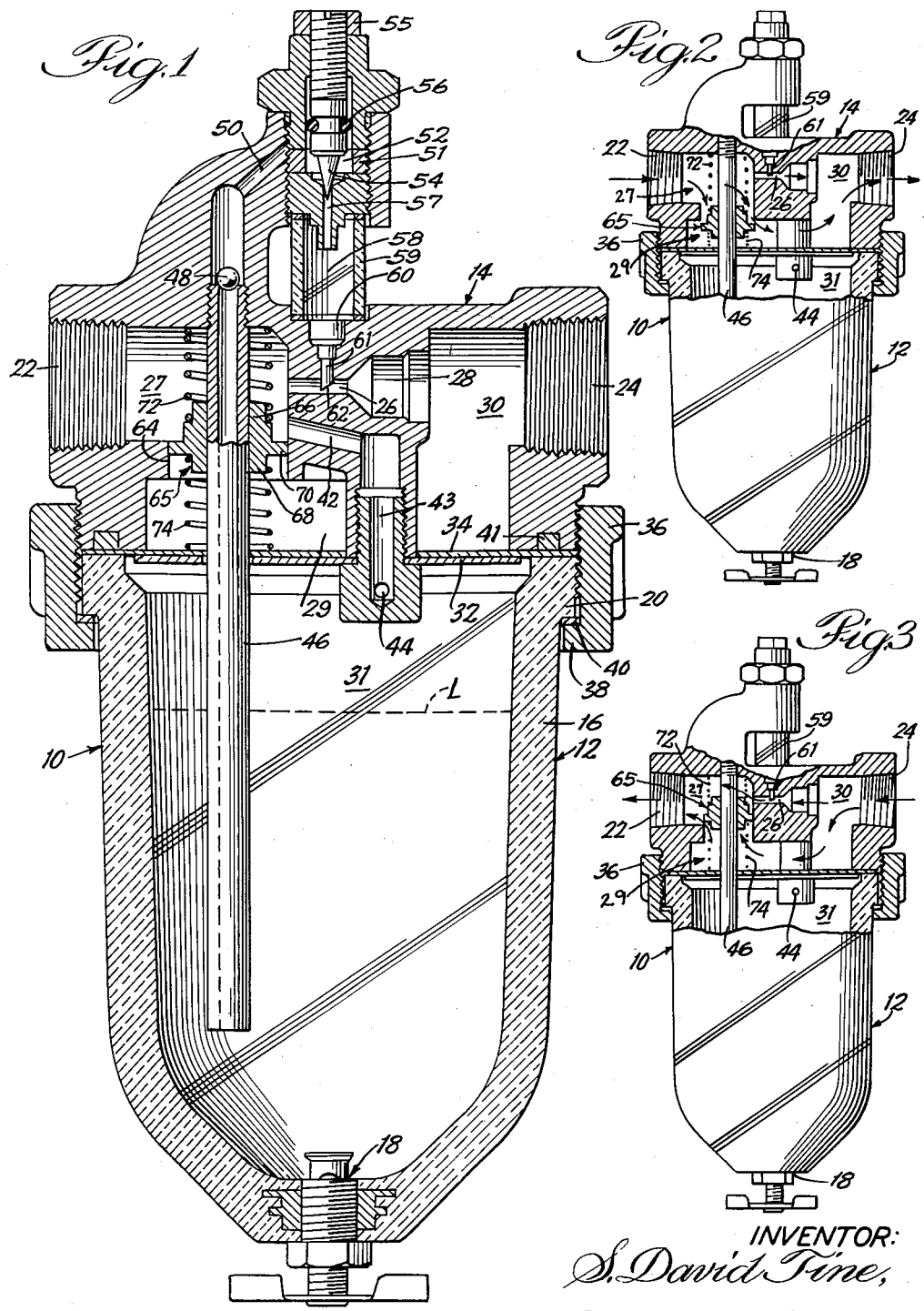
INVENTOR:
S. David Tine,
BY Bair, Freeman & Molinare
ATTORNEYS.

United States Patent Office 3,023,849
Patented Mar. 6, 1962

3,023,849
AIR LINE LUBRICATOR
Sebastian David Tine, Lawrence, Mass., assignor to Watts Regulator Company, Lawrence, Mass., a corporation of Massachusetts
Filed May 16, 1960, Ser. No. 29,226
7 Claims. (Cl. 184—55)

This invention relates to an air line lubricator and more particularly relates to an air line lubricator through which air is adapted to flow in opposite directions.

The instant invention is an improvement over the air line lubricator disclosed in U.S. Patent No. 2,887,181.

Air line lubricators are usually interposed in systems wherein the flow of air is unidirectional through the lubricator. Howver, there are instances where it is desirable to provide for flow of air in opposite directions through an air line lubricator. Where a single flow passageway is provided in the lubricator, there is very little problem to accommodate flow of air therethrough in a reverse direction. But where the normal flow passageway of the lubricator is unable to carry therethrough the full volume of flow that may be demanded by the system, it is the practice to provide a valved by-pass passageway to permit of supplying the increased flow of air that is demanded by the system, as, for example, shown in Figures 6–8 of U.S. Patent No. 2,887,181. The said valved by-pass pasageway of Patent No. 2,887,181 is unable to provide for full reverse flow of air therethrough, because of the check valve in the by-pass passageway, and hence the prior lubricator is unable to provide for reverse flow of air therethrough in excess of the amount of air that may be carried by the primary constricted air flow passageway of the lubricator.

It is, accordingly, one object of this invention to provide an air line lubricator for use in applications which require both forward and reverse air flow through the lubricator, and wherein the demands of the system, in both forward and reverse air flow, may be in excess of the amount of air that may be carried by the primary constricted air flow passageway through the lubricator.

Another object of this invention is to provide an air line lubricator having a valved make-up-air, by-pass, passageway therein through which may be passed air that is in excess of the air that may normally be passed by the primary flow passageway through the lubricator, and wherein substantially the same amounts of air may be passed through the lubricator in either of opposite directions at substantially the same pressure drop.

Further objects and advantages of this invention will become apparent as the following description proceeds and the features of novelty which characterize this invention will be pointed out with particularity in the claims annexed to and forming part of this specification.

A preferred embodiment of the invention is shown in the accompanying drawings, in which:

FIGURE 1 is a vertical axial cross-section view through an air line lubricator embodying the invention disclosed herein;

FIGURE 2 is a simplified drawing of the device of FIGURE 1, partly in elevation and partly in cross-section and of reduced size, and illustrates flow of air through the primary flow passageway and by-pass passageway in a "forward" flow direction; and FIGURE 3 is a simplified drawing of the device of FIGURE 1, partly in elevation and partly in cross-section and of reduced size, and illustrates flow of air through the primary flow passageway and by-pass passageway in a "reverse" flow direction.

Referring now to the drawings, there is shown in FIGURE 1 a lubricator generally indicated at 10, which embodies the invention disclosed herein. The lubricator 10 includes a lubricant reservoir 12 and a head 14 atop the reservoir 12. The reservoir 12 includes a transparent or translucent bowl 16 made of plastic or the like and through which can be observed the level of lubricant. The lower portion of bowl 16 carries therein a drain, generally indicated at 18, and the upper portion of bowl 16 is formed to define an outwardly extending flange 20.

The lubricator head 14 is appropriately shaped and machined to define a first threaded conduit connection 22 and a second threaded conduit connection 24, which are adapted for connecting head 14 in a circuit through which gas may flow in either direction. A flow passageway means is provided between the first and second conduit connections 22 and 24; and said flow passageway means includes a constricted flow portion, or throat, 26 which communicates at one end thereof with enlarged chamber 27 and at its other end with an enlarged passageway portion 28 that opens to a very large chamber 30 that communicates with the second conduit connection 24.

The flow passageways defined in the lubricator head 14 are generally separated from an air space 31, above a supply of lubricant L which is maintained in bowl 16, by means of a baffle plate 32. The rigid baffle plate 32 has a gasket 34 connected to the upper side thereof, which gasket 34 is of sufficient dimension to have peripheral portions thereof positioned between the upper edge of bowl 16 and the lower side of head 14. An annular connector nut 36 is provided, carried by head 14, for clamping together the bowl 16 and the head 14. The nut 36 has an inwardly extending annular flange 38 which overlaps the flange 20 on bowl 16 and operates to effect the clamping of the reservoir 12 against the lubricator head 14. A gasket 40 is located between flanges 38 and 20. A peripheral gasket 41 is provided in a recess in the underside of head 14 to insure sealing between the head 14 and the bowl 16.

The static or total pressure of the gas passing through the primary gas flow passageway, which extends between conduit connection 22 and conduit connection 24, is utilized to help force lubricant from the reservoir to the throat 26. This static pressure is communicated to space 31 by means of a flow passageway 42, the upstream end of which opens to chamber 27 and the downstream end of which communicates with a vertical passageway 43 whose lower end communicates through one or more laterally opening apertures 44 to space 31. The laterally opening apertures 44 are located in communication with the air space 31 above the upper level of the lubricant L within the reservoir. It will be understood that when air, or other gas, is flowing through the head 14 from connection 22 to connection 24, the static pressure of the flowing gas is communicated through passageways 42, 43 and 44 to the space 31 above the lubricant, and this imposes a pressure upon the lubricant which assists to feed the lubricant through lubricant conduit means to the place where lubricant is dispensed into the flowing gas.

The lubricant conduit means includes an upright tubular dip member 46 which is connected to the head 14 and which extends from the upper portion of head 14 downwardly through gasket 34 and baffle 32 into the interior of bowl 16 to a point adjacent the bottom of bowl 16. A ball check valve 48 is provided in the lubricant conduit means and operates to maintain the upper portion of the lubricant conduit means substantially filled during periods of inactivity. The lubricant conduit means also includes a lubricant passageway 50, located above and downstream of ball check 48, and which opens laterally into a first reservoir chamber 52 whose outlet is controlled by a selectively adjustable needle valve 54 carried by a threaded controller 55 which carries an O-ring 56 to seal the upper end of first chamber 52. The chamber 52 opens through a downwardly extending tube 57, the upstream end of which cooperates with the needle valve 54 to control the rate of flow of lubricant therethrough. The lubricant passing from tube 57 passes to a second chamber 58 which is bounded in part by a transparent sight tube 59. The second chamber 58 permits flow of lubricant through passageway 60 and through a constricted dispensing tube 61, whose lower terminus is beveled at 62. The beveled terminus 62 is located centrally of throat 26 at an attitude with the bevel 62 facing downstream toward connection 24.

The lubricator head 114 is shaped and arranged to define gas by-pass passageway means which includes a sleeve, or tubular part, 64, the peripheral walls of which extend axially upwardly. Within the sleeve 62 is an annular, double-acting, valve member 65 which is slidably mounted on an upper portion of dip member 46. The annular valve member 65 has an upstream shouldered portion 66 and a downstream shouldered portion 68, and a central, radially enlarged, portion 70, the peripheral edge of which slidably cooperates with the walls of sleeve 64. An upper coil spring 72 surrounding tubular member 46 is positioned within chamber 27 and abuts at its upper end with a portion of the head 14, and its lower end cooperates with the shouldered part 66 of the valve member 65. A lower coil spring 74 surrounding the tubular member 46 is positioned between the shouldered part 68 on the valve member 65 and the support provided by baffle 32 and gasket 34. The balanced arrangement of the bias of the springs 72 and 74 is such that the valve member 65 is balanced in the normally closed position in sleeve part 64 shown in FIGURE 1, and operates to normally close the by-pass passageway and to separate the chamber 27 above the valve member 65 from the chamber 29 located below the valve member 65. It will be understood that the chamber 29 is in direct communication with chamber 30 within the head 14.

From the foregoing it will be understood that as air or gas flows through the head 114 either from connection 22 to connection 24, or from 24 to 22, the air passing through throat 26 has lubricant dispensed thereinto from tube 61. It will be observed that the constricted throat 26 is much smaller than that required to pass the maximum gas carrying capacities of the connections 22 or 24. Therefore, it is possible for the circuit, in which the lubricant is positioned, to demand greater gas flow than can be accommodated by the throat 26.

Accordingly, in the operation of the device, as air is flowing in the direction from connection 22 to connection 24, and if there is demand for air greater than can be passed by throat 26, the pressure differential will cause the valve member 65 to move against the bias of spring 74 to the position illustrated in FIGURE 2, wherein a by-pass passageway is established from chamber 27 to chamber 29 around the valve 65, so that, in addition to the lubricated air which emerges from throat 26, there is additional by-passed air supplied through chambers 27, 29, and 30 to the conduit connection 24.

In those instances where the lubricator 10 is used to accommodate flow in a reverse direction, and where there is an excessive demand for air at connection 22, or if there is an excessive pressure of air supplied at connection 24, then the valve member 65 will move upwardly against the bias of spring 72 toward the position seen in FIGURE 3. This will establish a by-pass passageway for flow of air through chambers 30, 29 and 27 to conduit connection 22, it being understood, of course, that during this time the throat 26 is carrying all of the air capacity that it possibly can pass.

It will thus be seen that the lubricator herein provides means for by-passing a portion of the gas, which passes through the head 14, around the constricted throat 26, regardless of the direction of flow of gas through the head 14. Thus, the total amount of gas which may pass through the head 14, in either direction, is greater than what could be normally passed through the throat 26 alone. The valve member 65 is operative to open in opposite directions under the pressures of the gas flowing through the head 14 in opposite directions.

While there has been shown and described a particular embodiment of this invention, it will be obvious to those skilled in the art that various changes and modifiations may be made therein without departing from the invention and, therefore, it is intended in the appended claims to cover all such changes and modifications as fall within the true spirit and scope of the invention.

What I claim as new, and desire to secure by Letters Patent of the United States, is:

1. A lubricator comprising, in combination a lubricant reservoir, a head connected to said reservoir, means in said head defining first and second conduit connections for connecting said head in a circuit through which gas is adapted to flow in either direction, means in said head defining a constricted flow passageway between said first and second conduit connections, the constricted flow passageway being smaller than that required to pass the maximum gas carrying capacities of said conduit connections, by-pass means defining a by-pass passageway for by-passing a portion of the gas, passing through the head between said conduit connection, around the constricted flow passageway, and means for controlling said by-pass means to accommodate a flow, in either direction through said head, of an amount of gas which is greater than the amount that may be normally passed through the constricted flow passageway.

2. A lubricator comprising, in combination, a lubricant reservoir, a head connected to said reservoir, means in said head defining first and second conduit connections for connecting said head in a circuit through which gas is adapted to flow in either direction, means in said head defining a constricted flow passageway between said first and second conduit connections, the constricted flow passageway being smaller than that required to pass the maximum gas carrying capacities of said conduit connections, means defining a by-pass passageway for by-passing a portion of the gas, passing through the head between said conduit connections, around the constricted flow passageway, for accommodating a flow, in either direction through said head, of an amount of gas which is greater than the amount that may be normally passed through the constricted flow passageway, and normally closed valve means in said by-pass passageway being operative to open in either direction under the pressure of gas flowing through said head in either direction.

3. A lubricator comprising, in combination, a lubricant reservoir, a head connected to said reservoir, means in said head defining first and second conduit connections for connecting said head in a circuit through which gas is adapted to flow in either direction, means in said head defining a constricted flow passageway between said first and second conduit connections, the constricted flow passageway being smaller than that required to pass the maximum gas carrying capacities of said conduit connections, means defining a by-pass passageway for by-passing a portion of the gas, passing through the head between said conduit connections, around the constricted flow passageway, for accommodating a flow, in either direction through said head, of an amount of gas which is greater than the amount that may be normally passed through the constricted flow passageway, normally closed valve means in said by-pass passageway being operative to open in either direction under the pressure of gas flowing through said head in either direction, and balanced spring means resiliently maintaining said valve member normally in juxtaposition with a sleeve part defined in said head, to normally close said by-pass passageway.

4. A lubricator comprising, in combination, a lubricant reservoir, a head connected to said reservoir, means in said head defining first and second conduit connections for connecting said head in a circuit through which gas is adapted to flow in either direction, means in said head defining a constricted flow passageway between said first and second conduit connections, the constricted flow passageway being smaller than that required to pass the maximum gas carrying capacities of said conduit connections, means defining a by-pass passageway for by-passing a portion of the gas, passing through the head between said conduit connections, around the constricted flow passageway, for accommodating a flow, in either direction through said head, of an amount of gas which is greater than the amount that may be normally passed through the constricted flow passageway, a baffle positioned between said head and said reservoir and partially defining said by-pass passageway, lubricant conduit means including an upright tubular member extending from said reservoir through said baffle and above said baffle into said head, and normally closed valve means in said by-pass passageway, including a double acting valve member slidably positioned on said upright tubular member, being operative to open in opposite directions under the pressure of gas flowing through said head in said opposite directions.

5. A lubricator comprising, in combination, a lubricant reservoir, a head connected to said reservoir, means in said head defining first and second conduit connections for connecting said head in a circuit through which gas is adapted to flow in either direction, means in said head defining a constricted flow passageway between said first and second conduit connections, the constricted flow passageway being smaller than that required to pass the maximum gas carrying capacities of said conduit connections, means defining a by-pass passageway for by-passing a portion of the gas, passing through the head between said conduit connections, around the constricted flow passageway, for accommodating a flow, in either direction through said head, of an amount of gas which is greater than the amount that may be normally passed through the constricted flow passageway, a baffle positioned between said head and said reservoir and partially defining said by-pass passageway, lubricant conduit means including an upright tubular member extending from said reservoir through said baffle and above said baffle into said head, normally closed valve means in said by-pass passageway being operative to open in opposite directions under the pressure of gas flowing through said head in said opposite directions, said valve means including a double acting valve member slidably positioned on said upright tubular member, and balanced spring means resiliently maintaining said valve member normally in juxtaposition with a sleeve part defined in said head, to normally close said by-pass passageway, including a first coil spring surrounding said tubular member and positioned between said valve member and said baffle, and a second coil spring surrounding said tubular member and positioned between said valve member and said head.

6. For use in a lubricating system wherein gas passing in either of two directions is arranged to pass through an opening constricting the gas flow therethrough, the improvement comprising means for passing said gas into a lubricant reservoir for forcing said lubricant from said reservoir into the gas, means defining a portion of a by-pass passageway around said constricted opening, and a valve operable in either of two directions for completing said by-pass passageway to permit gas flow through said by-pass passageway irrespective of the direction in which said gas is moving through said opening.

7. The arrangement claimed in claim 6 in which said valve is operable about an axis perpendicular to the longitudinal axis of said constricted opening.

References Cited in the file of this patent

UNITED STATES PATENTS

| | | |
|---|---|---|
| 1,087,890 | Rogers | Feb. 17, 1914 |
| 2,707,529 | Monnier | May 3, 1955 |
| 2,778,619 | Goodyer | Jan. 22, 1957 |
| 2,887,181 | Dillon | May 19, 1959 |